US008661259B2

(12) United States Patent
Yocom-Piatt et al.

(10) Patent No.: US 8,661,259 B2
(45) Date of Patent: Feb. 25, 2014

(54) DEDUPLICATED AND ENCRYPTED BACKUPS

(75) Inventors: Jacob Yocom-Piatt, Chicago, IL (US); Marco Antonio Peereboom, Round Rock, TX (US)

(73) Assignee: Conformal Systems LLC, Chicago, IL (US)

( * ) Notice: Subject to any disclaimer, the term of this patent is extended or adjusted under 35 U.S.C. 154(b) by 508 days.

(21) Appl. No.: 12/973,322

(22) Filed: Dec. 20, 2010

(65) Prior Publication Data

US 2012/0159175 A1  Jun. 21, 2012

(51) Int. Cl.
*H04L 29/06* (2006.01)
(52) U.S. Cl.
USPC ............ 713/176; 713/181; 713/189; 713/193
(58) Field of Classification Search
USPC .................. 713/176, 181, 189, 193
See application file for complete search history.

(56) References Cited

U.S. PATENT DOCUMENTS

| 2008/0104146 | A1 | 5/2008 | Schwaab et al. | |
| 2009/0313483 | A1* | 12/2009 | Ranade | 713/193 |
| 2010/0058013 | A1 | 3/2010 | Gelson et al. | |
| 2010/0083003 | A1* | 4/2010 | Spackman | 713/193 |
| 2010/0268960 | A1* | 10/2010 | Moffat et al. | 713/181 |
| 2010/0275035 | A1* | 10/2010 | Manabe | 713/189 |

FOREIGN PATENT DOCUMENTS

| EP | 0774715 A1 | 5/1997 |
| WO | WO-03/019412 A2 | 3/2003 |

OTHER PUBLICATIONS

IEEE, "IEEE Standard for Cryptograhic Protection of Data on Block-Oriented Storage Devices," IEEE Computer Society, IEEE Std 1619™ (2007).
"Disk Encryption Theory," Wikipedia, http://en.wikipedia.org/wiki/Disk_encryption_theory, Nov. 25, 2010, 7 pages.
European Search Report for Application No. 11190130.2-2212 issued Mar. 26, 2012.

* cited by examiner

*Primary Examiner* — Brandon Hoffman
*Assistant Examiner* — Thong Truong
(74) *Attorney, Agent, or Firm* — Marshall, Gerstein & Borun LLP; Andrew R. Smith

(57) ABSTRACT

A system and method for efficiently creating deduplicated and encrypted data across a plurality of computers allows local encryption and remote storage of deduplicated segments. Large data blocks may be divided into segments of data, and encrypted using a two-step process. A standard hash of the encrypted segment is used as an index into a remote deduplicated database so that only unique data segments are stored, and are stored only in encrypted form. When retrieving data, a data owner uses the stored digest to retrieve the data from the deduplicated database and the stored IV and second key to decrypt the data. Only the data owner has the second key and IV, so the encrypted data segment stored data in the deduplicated database is highly secure from information bleed during the storage process.

16 Claims, 7 Drawing Sheets

DEDUPLICATED AND ENCRYPTED BACKUPS

BACKGROUND

This Background is intended to provide the basic context of this patent application and it is not intended to describe a specific problem to be solved.

Storing redundant data consumes both time and resources in the form of network traffic and storage resources. Deduplication is a process that removes, or more efficiently, doesn't store the same data twice. Conventional deduplication systems support offsite storage by receiving data from a client or user in the clear at the storage facility. The data is hashed and the hash is checked against an index of hashes to see if the data is already present. If the data is not present, it is encrypted with keys held at the storage facility and archived.

Such a process exposes the data to several risks, including interception during transmission, cryptographic attacks that expose the keys, or compromise of the keys themselves at the storage facility.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Data intended for deduplicated backup is encrypted and hashed at a user location before being sent to a storage service. To begin, a user may first generate two long life keys. The data is processed with a keyed hash algorithm such as a hash-based message authentication code (HMAC) algorithm using the first key. The resulting hash or initialization vector (IV) is used along with the second key in a two key encryption algorithm to encrypt the data. The digest may be forwarded to the storage service and if the digest, and therefore the encrypted data, is not already present, the storage service may request that the encrypted data be sent for storage. If the digest is present, the storage service may simply send a message to the user location that the data is present.

In an alternate embodiment, such as where network access is readily available, both the digest and encrypted data may be sent to the storage service initially. A simple response as to whether the data was stored or discarded may then be returned.

To recover the data, a user sends the digest to the storage service. After the user is authenticated to the storage service, the digest is used to locate the encrypted data, which is then returned to the user. At the user location, the IV for that data and the second key are used to decrypt and recover the original data.

DETAILED DESCRIPTION OF THE INVENTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term 'is hereby defined to mean . . . '" or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
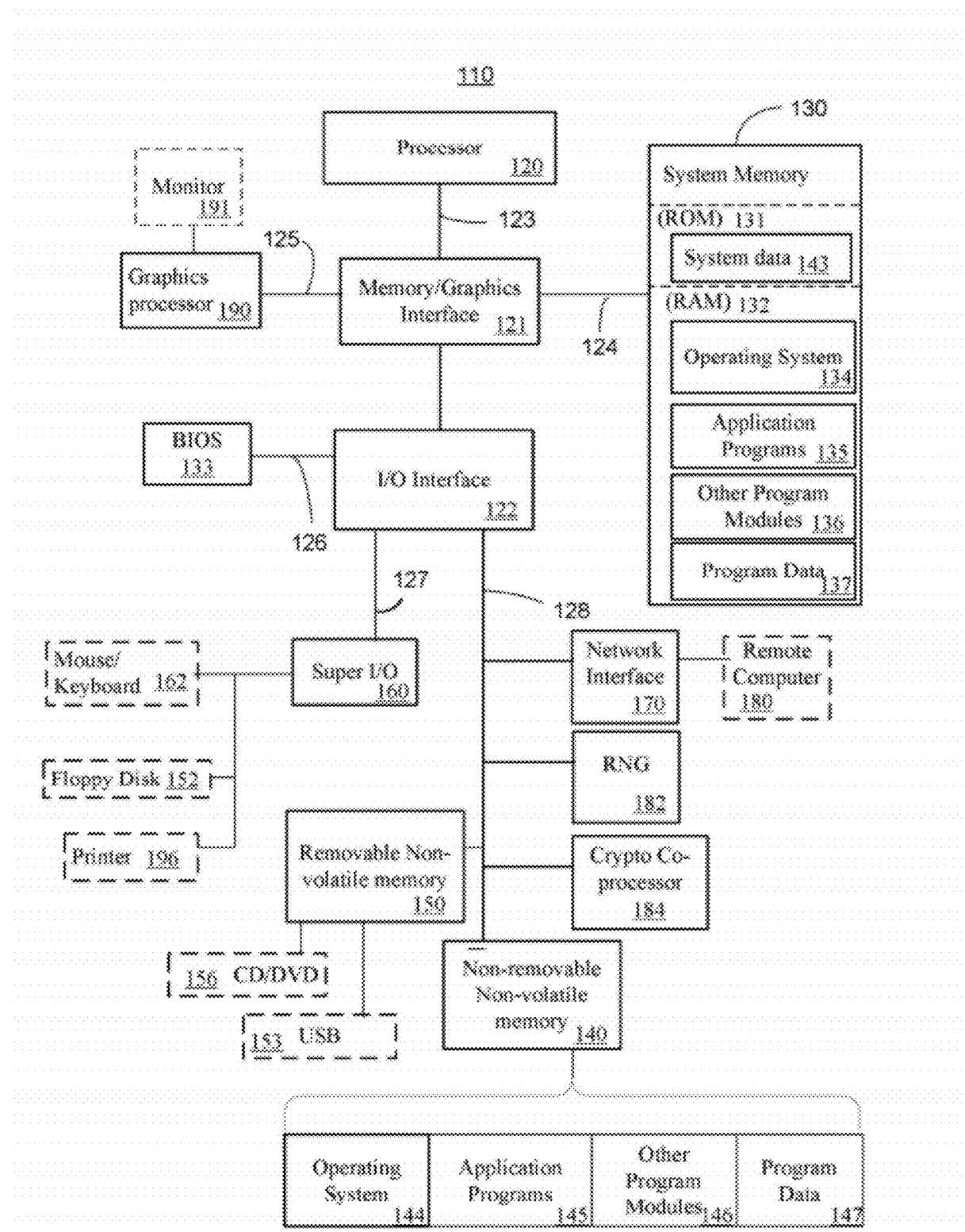
FIG. 1 is an illustration of a computing device.
Figure 2:
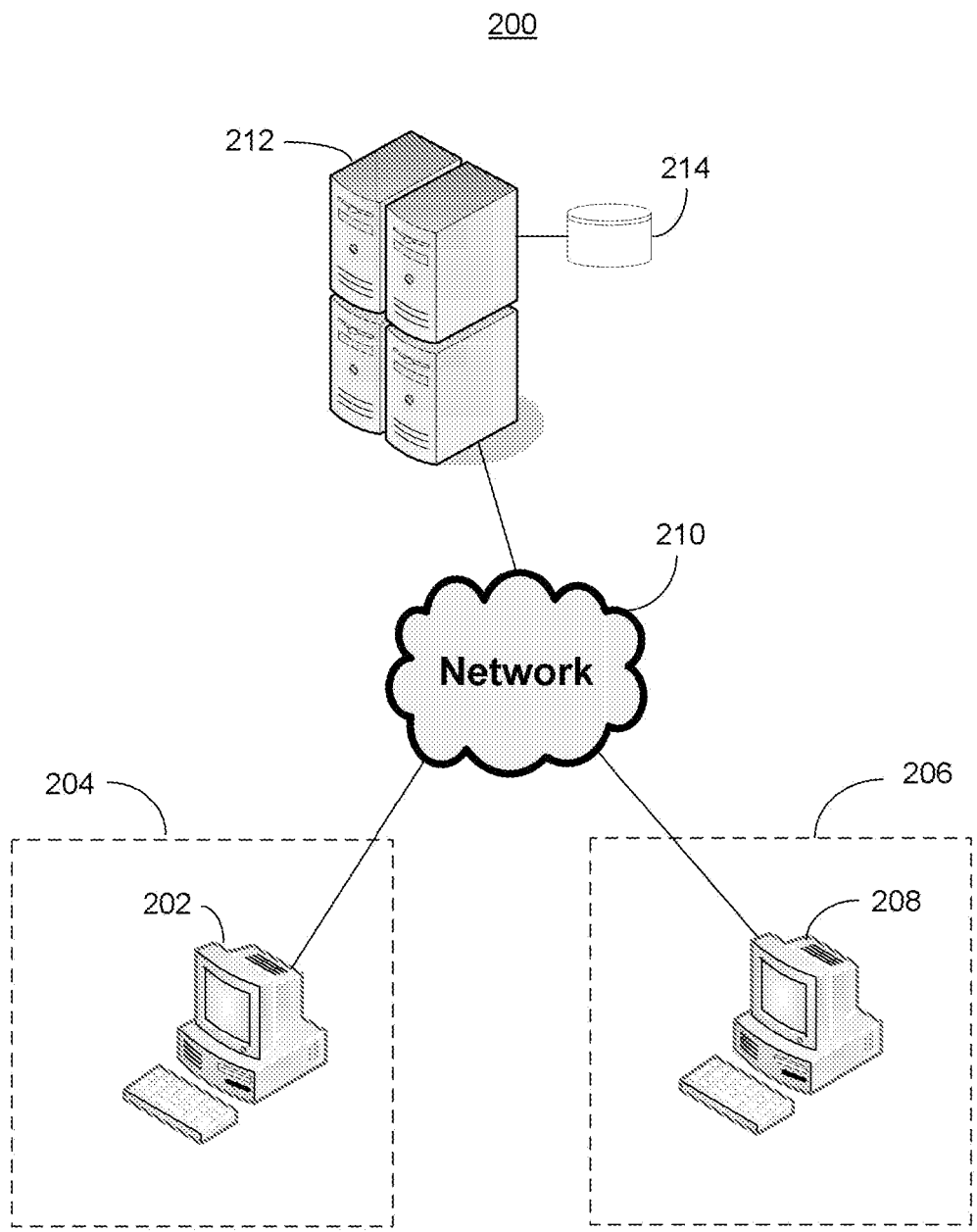
FIG. 2 is an illustration of a computing environment supporting deduplicated backup.
Figure 3:
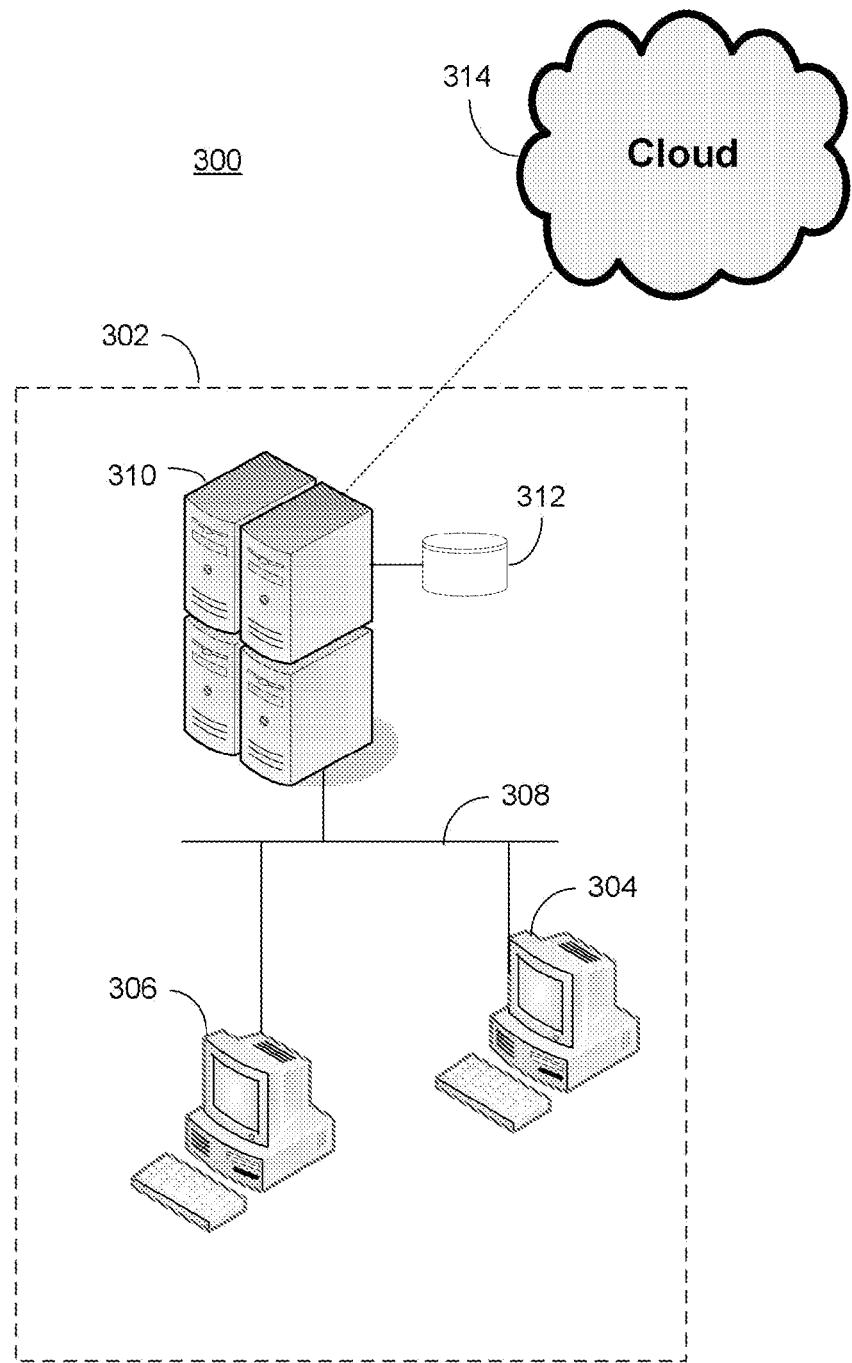
FIG. 3 is an illustration of a second computer environment supporting deduplicated backup.
Figure 4:
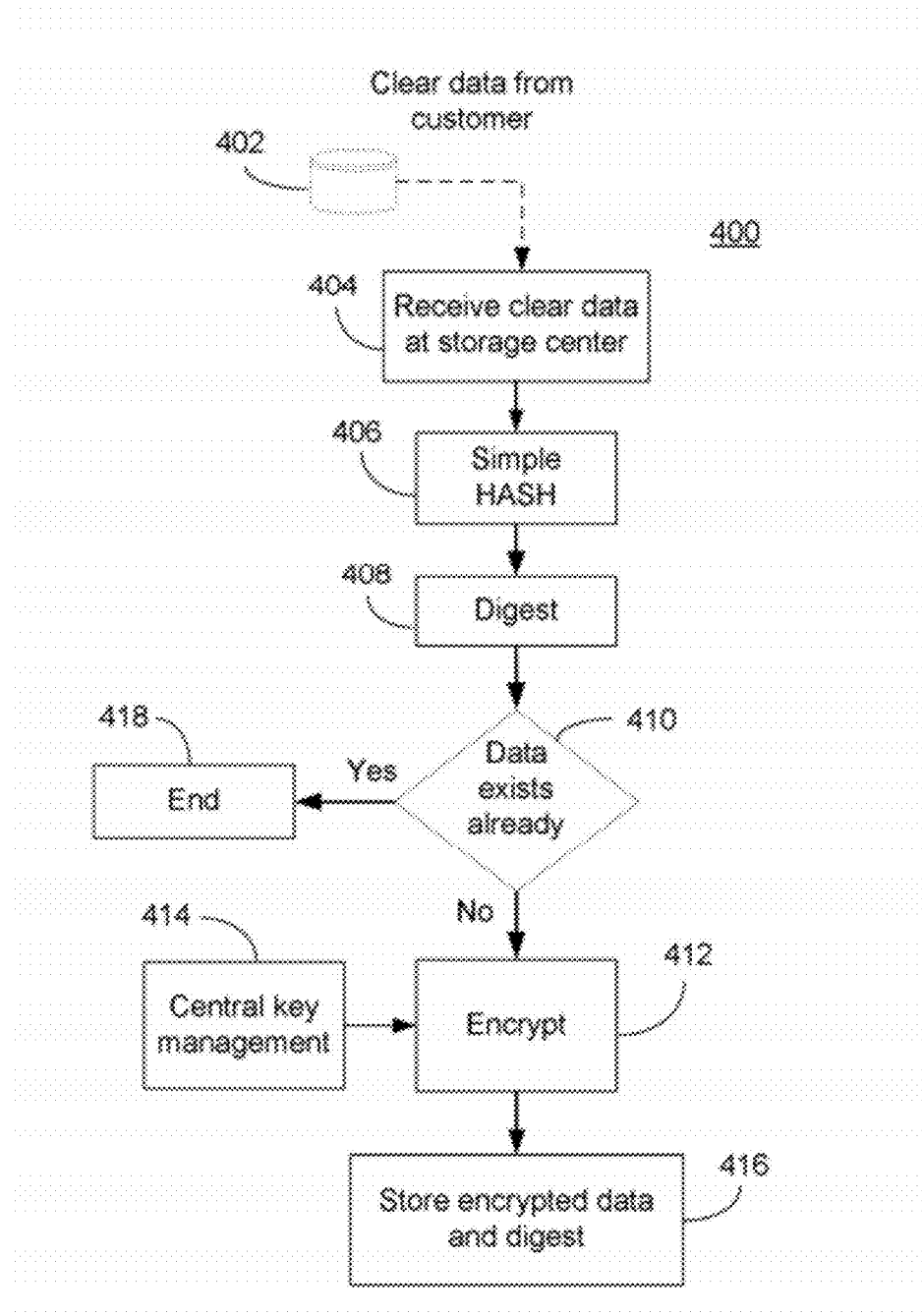
FIG. 4 is an illustration of a method of performing a prior art deduplicated backup.
Figure 5:
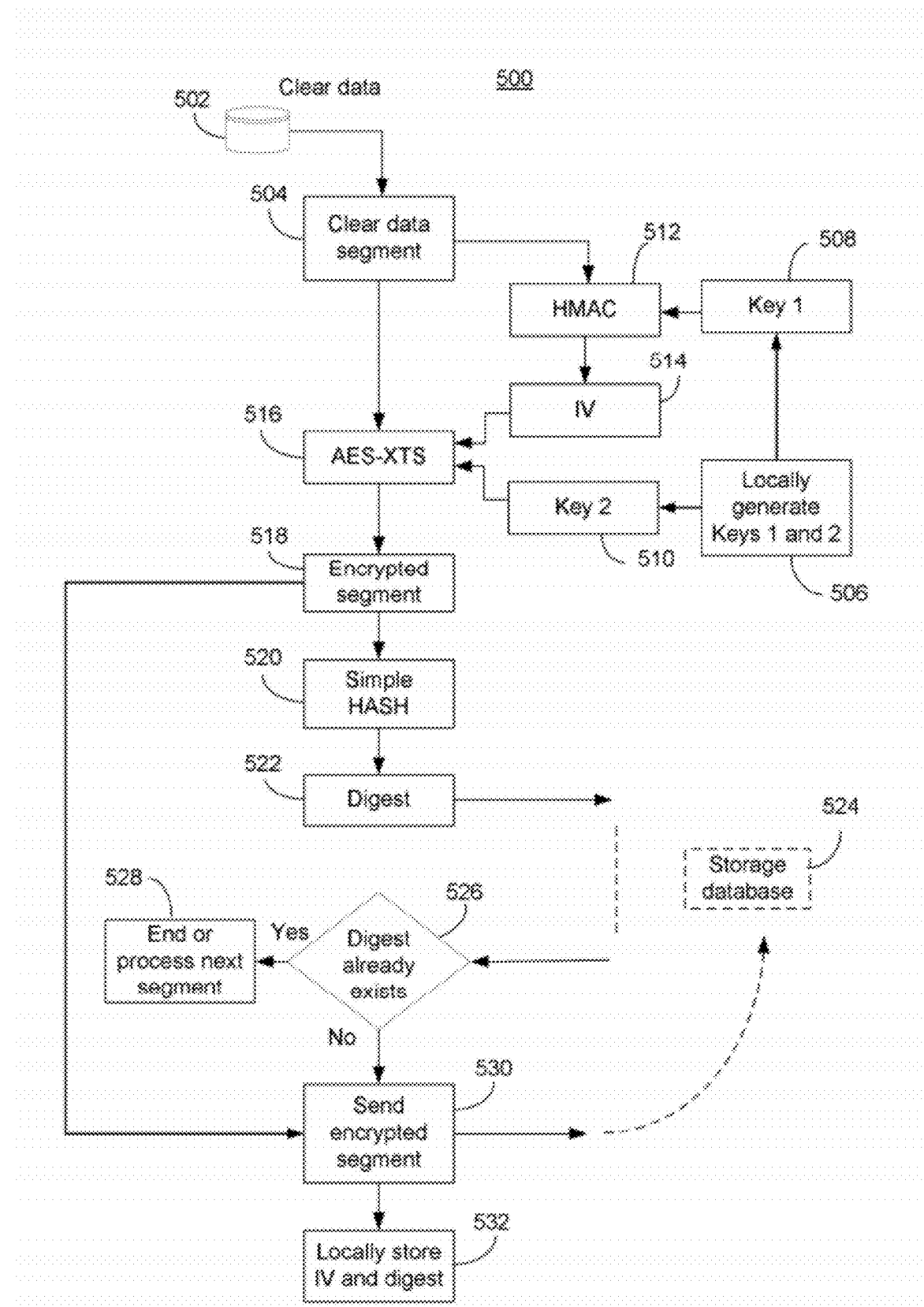
FIG. 5 is an illustration of a method of performing a deduplicated and encrypted backup.
Figure 6:
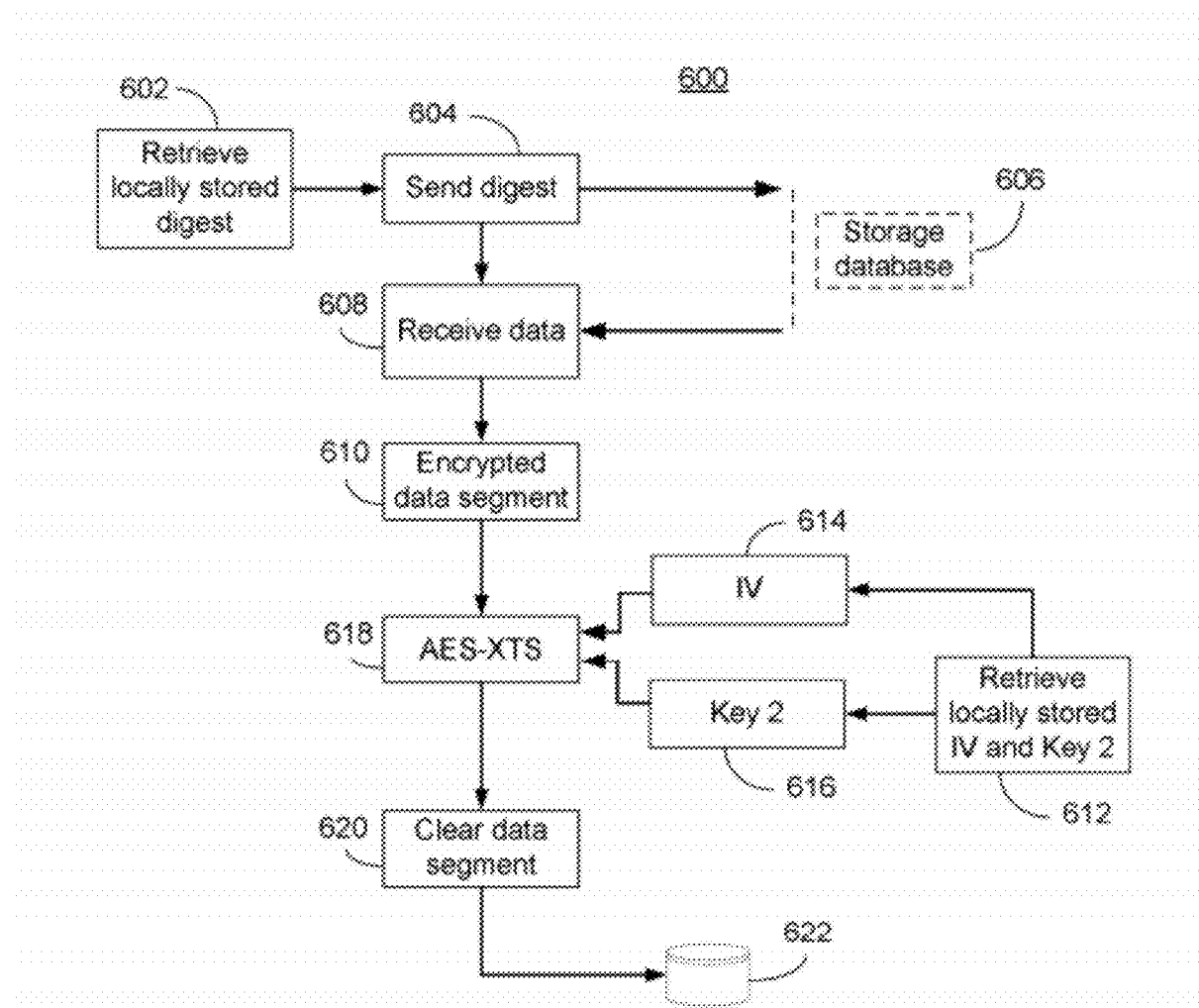
FIG. 6 is an illustration of a method of recovering a deduplicated backup.
Figure 7:
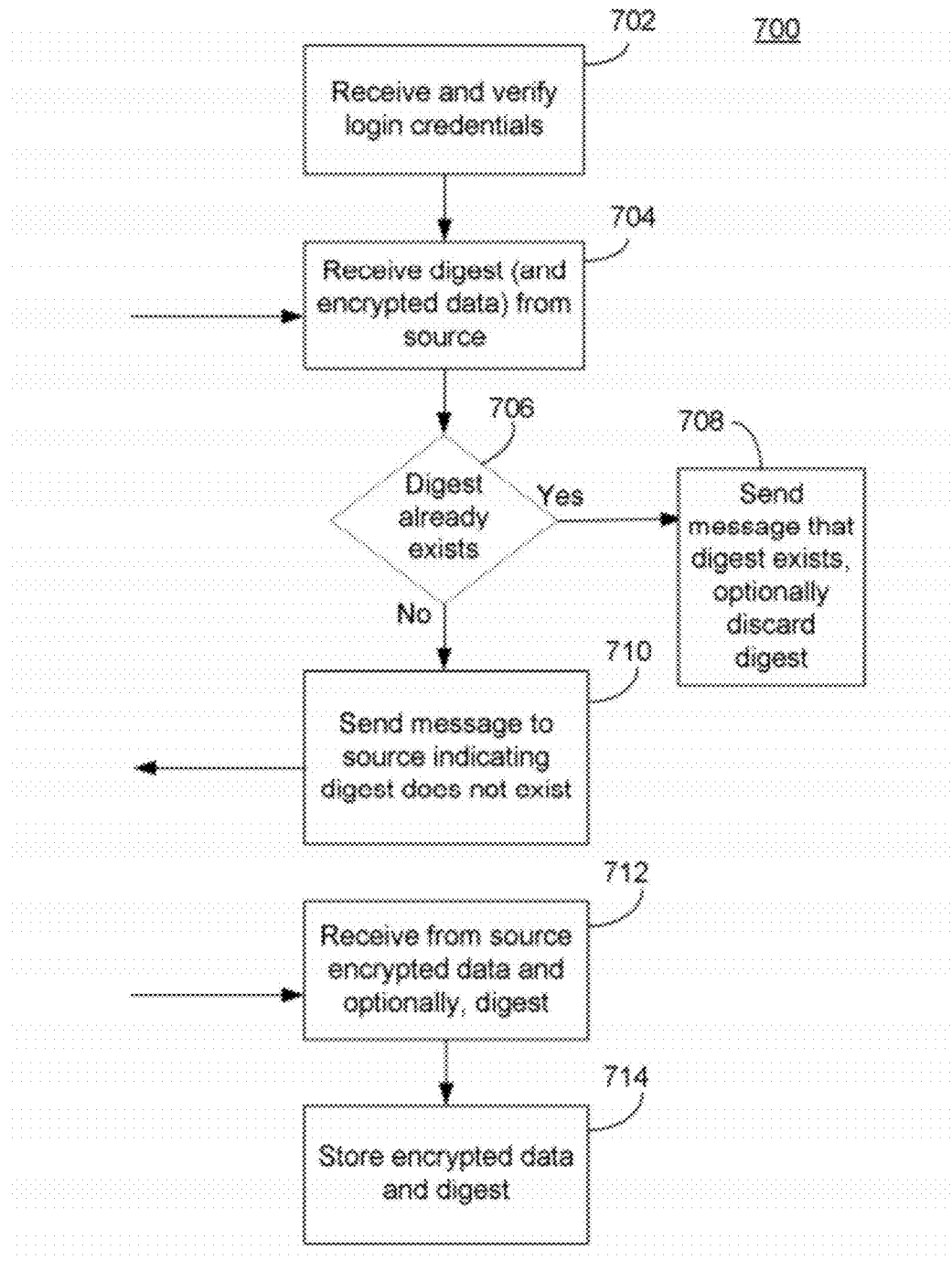
FIG. 7 is an illustration of a method of storing deduplicated data at a server.

This disclosure is organized in several sections. FIGS. 1-3 illustrate a representative computer and computing environment that are suitable for supporting the system and methods of the claimed invention. FIG. 4 discusses a prior art system in the general field. FIGS. 5-7 and their related discussion disclose embodiments of providing deduplicated and encrypted backups.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121 and an I/O interface 122. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer executable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as computer-specific data that may be used as a seed for generating ransom numbers or nonces, for example, for use in providing deduplicated and encrypted backups. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace. In one embodiment, bus 128 may be a Peripheral Component Interconnect (PCI) bus.

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive.

Removable media, such as a universal serial bus (USB) memory 153, firewire (IEEE 1394), or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide local memory storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical communication ports to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110, for example, for use in performing a deduplicated and encrypted backup.

A cryptographic co-processor 184 may be used for cryptographic functions, including encryption and hashing functions, such as those used in creating digests or hashes, and encrypted data as described further below. Cryptographic co-processors, or cryptographic unit are commercially available, such as the IBM CEX3C/4765. The cryptographic co-processor 184 may also act as a secure storage location for locally generated keys and IV data (discussed below). Alternatively, secure storage may be provided by another component, such as a smart card (not depicted). In yet another alternative, key storage may be provided external to the device, such as at a storage service provider using strong protections.

A random number generator (RNG) 182 may be used to generate random or pseudo-random numbers for use in generating symmetric keys, nonces, and the like. The RNG 182 may be incorporated in the cryptographic co-processor 184 or may be a separate component.

FIG. 2 illustrates a computing environment 200 capable of supporting a deduplicated backup environment. An exemplary user computer 202 at a first user location 204 and a second computer 206 at a second user location 208 may be connected through a network 210, such as the Internet, to a server 212 with a storage database 214. When the server 212 is more or less unaffiliated with the locations 204 and 208, the server 212 may be thought of as in the 'cloud.'

The user locations 204 and 208 may be representative of an individual user, a small unit of an organization, or a larger group such as an enterprise or agency. Correspondingly, the first and second computer may be representative of a range of computing devices from a single desktop to a network of computers, servers, laptops, smart phones, etc. Typically, the members of a user location are part of a trust group for which shared access to data may be routine or acceptable. If a particular sub-group at a user location has specific security needs, all or part of the backup environment, including key generation and use, may be duplicated to ensure adequate security for that sub-group's data. Typically, the user locations 204 and 208 will benefit from an economy of scale as more data is centrally managed and processed for deduplicated backup.

In operation, a user at the first location 204 may use a computer adapted to perform deduplicated backups, such as computer 202, to generate keys for use in encrypting and decrypting files, creating hashes, and for secure communication. A computer, the same as, or similar to, computer 110 of FIG. 1 may be used for this purpose. In a process more fully described below with respect to FIG. 5, a user at computer 202 may identify data that is to be securely backed up. The data may include program data 137 illustrated in FIG. 1 and may be business information, archival information, etc. A program at the computer 202 may cause two keys to be generated and stored internally for use in a two step process for preparing the data. First, a keyed hashing routine may use the first of the two keys to create a first hash of the data. That first hash may be used as an initialization vector (IV) or simply, as a derived key based on the original data. Second, the data to be stored may be encrypted with a two-key algorithm using the second key and the IV (or derived key).

After the data is encrypted, a simple hash, such as a SHA-1 or SHA-2 may be taken for use as an index to the encrypted data. The simple hash may be sent to the server 212 and if the hash is not already present at storage database 214, it may be assumed that no copies of the encrypted data are present and steps may be taken to transfer and store the encrypted data. In most cases, the hash will be smaller than the encrypted data, so a savings in transmission time and bandwidth may be realized over a prior art method that sends the full data each time.

Another user at a second location 206 may use an exemplary computer 208 that is also adapted for deduplicated backup in a process similar to that described immediately above. Even if identical information at locations 204 and 206 is to be stored, several factors protect detection of the nature of the data by any non-authorized party. First, separate login accounts may be used to keep data at the server 212 separated. Further, the multiple hashing processes and the two-key encryption of data with locally generated root keys will prevent even identical original data from each site 204 and 206 from having the same signature or the same encrypted result when transmitted to the server 212.

The keys, initialization vectors, salt used in key storage, and metadata related to the backup may be stored locally in a secrets file or in a protected memory. Because of the sensitivity of this data, it may be protected using a known technique, such as a password-based key derivation function (PDBKDF) that is part of the RSA Laboratories' PCKS series. Other protection techniques may also be used.

To protect against data loss at the local computer, metadata holding the IV and related keys may be encrypted and stored on the server 212. To recover from a lost machine, the data owner may download any required client software that manages the above processes, use a backup or download the encrypted metadata file or files, authenticate and decrypt the metadata, and user the decrypted metadata and related secrets to recover/rehydrate deduplicated backup data.

FIG. 3 is an illustration of a second computing environment 300 that may be used for storing deduplicated backup data. FIG. 3 simply illustrates that the technique for deduplicated backup can be used within a single location 302 having exemplary computers 304 and 306 connected, for example, by a local area network 308 to a server 310. The server 310 and its associated storage database 312 may or may not be connected to a cloud 314, for example, a public network such as the Internet. The cloud 314 may be used by the server 310 for additional storage space or for archival purposes.

FIG. 4 may illustrate a method 400 of performing a prior art deduplicated backup. Data for backup may be sent by a data source at block 402 to a server. The data may be delivered to the server in the clear, depending on the backup system to provide deduplication services and encryption for storage, as described more fully below.

At block 404, the data in the clear may be received at the storage/backup center. At block 406 a simple hash of the data may be performed, creating a digest at block 408.

At block 410, the hash may be compared to a database of hashes. If the hash already exists, there is a presumption that the data already exists and the 'yes' branch may be taken from block 410 to block 418, where the method may end, and optionally, a message indicating data was not stored may be sent to the data source.

If, at block 410, the hash does not already exist, indicating the data is not already present, the 'no' branch may be taken to block 412. At block 412, the data may be encrypted using keys generated at block 414 by a central key management function.

At block 416, the encrypted data may be stored, and, optionally, a message indicating the storage activity may be sent to the data source.

FIG. 5 is an illustration of a method 500 of performing a deduplicated and encrypted backup in accordance with the current disclosure. In contrast to the prior art method described with respect to FIG. 4, the process illustrated at FIG. 5 occurs at a user location, such as at computer 202 of FIG. 2 or computer 304 of FIG. 3.

At block 502, data, such as an information set of backup data, may be stored locally in the clear and may be identified for deduplicated backup (block 502). The data may be part of a data set that is routinely backed up or may be particularly identified in a separate administrative process. Because the data is processed locally, realm-wide deduplication can be achieved, that is, virtually all the data in a particular domain (department, facility, corporation, etc.), can be stored in a deduplicated fashion. Thus, multiple copies of the same data are not stored at a storage facility. Depending on how the data is identified and segmented, even document elements, such as letterhead captions can be stored once, rather than with each document. At block 504, the data may be divided into segments, for example, if the data is too large to conveniently manage. For example, in some embodiments, data may broken into segments for processing and may be stored as a deduplicated set at the storage facility. For example, 256 byte segments may be used but in other embodiments, other segment sizes may be used. In yet another embodiment, the segment sizes may be variable.

In a process not directly connected to processing each data segment, at block 506 at least two keys may be generated. Each key may be a symmetric key and may be generated using a random number generator, such as RNG 182 of FIG. 1. In some embodiments more keys may be generated and used in a sequence (known as key rolling) or to develop derived keys, etc. In a current embodiment, each key may be 256 bits in length, but other key sizes can also be used.

Key 1 from block 508 may be used in generating a keyed hash of the data segment at block 512. An HMAC hashing algorithm, known in the art, may be used for the keyed hashing function. Like a simple hash, the keyed hash provides a digest of the data segment, however, the keyed hash algorithm creates greater distance from the original data, reducing the chance that original data can be recovered from the hash or digest. As is typical with most hashing functions, the resulting hashes or digests may be a common size, such as 160 bits, no matter how big the original data.

The result of block 512 may be used as in initialization vector (IV) and along with key 2 from block 510 may used at block 516 for performing a symmetric encryption of the data segment. Unlike a hashing function, symmetric encryption is a lossless process that generally has a result that is similar in size to the original data.

In one embodiment, an AES-XTS algorithm may be used at block 516. The AES-XTS algorithm was developed for, and is known for, use in encrypting data on a hard disk drive. The second key in the AES-XTS algorithm is defined as the hard disk segment identifier. However, as used in this current method, the AES-XTS algorithm may be modified so that the second key is the IV that is generated from the data segment itself. The use of the IV instead of a relatively predictable disk segment number gives an increased level of encryption strength over the base AES-XTS algorithm or a single-key algorithm such as DES or even AES.

The resulting encrypted segment at block 518 is used at block 520 with a simple hash routine or algorithm to create a digest of the encrypted segment. The simple hash may be generated by, for example, a SHA-1, SHA-2, MD5, etc., hash algorithm. The strength of the hash at block 520 is relatively unimportant because the input to the hash algorithm is already a strongly encrypted segment of data. Of course, a keyed hash or other one-way algorithm may be used instead of the simple hash that is used here for illustration. As is common practice, there is an assumption of a unique one-to-one relationship between the encrypted segment and the simple hash or digest.

At block 522, the digest created by the hash operation at block 520 may be sent to a storage facility with a storage database, such as storage database 214, at block 524. The storage database may check whether the digest is present in the storage database.

At block 526, a message from the storage database may be parsed to determine if the digest is already in the storage database. If the digest is already present, the 'yes' branch may be taken to block 528 and where the IV and digest may be stored, if not already present and the process ended for that data segment. In some embodiments, even if the data segment exists, the IV and digest may be saved as part of a scheduled backup process for audit and/or data recovery purposes. If additional data segments remain to be processed, the next data segment may be processed beginning at block 504.

If, at block 526, the digest is not present at the storage database, the 'no' branch from block 526 may be taken to block 530. At block 530, the encrypted segment created at block 518 may be sent to the storage facility to be stored in the storage database. Unlike the prior art system, data arriving at the storage database is already encrypted and is supplied with an associated digest for use as an index into the storage database.

At block 532, the IV for the most recently processed data segment is stored at the local computer for use in decrypting the data segment. The digest is also stored at the local computer for use as an index in requesting the encrypted data segment from the storage database, as described in more detail below. As above at block 528, if additional data segments remain to be processed, the next data segment may be processed beginning at block 504.

The data segments and their corresponding digests are locally created using strong encryption techniques, so no clear data need be sent outside the computer 212 or facility 204. The keys are locally generated and stored. Because no encrypted data is directly created with either key by itself, the keys are very difficult to compromise by an outside entity and therefore can have a very long life, avoiding complicated key management protocols.

Alternative embodiments of this method may include sending both the digest and the encrypted data at block 522. If the digest is not present at the storage database, the data may be stored immediately. If the digest is already present at the storage database, the data may simply be discarded.

FIG. 6, in accordance with the present disclosure, is an illustration of a method 600 of recovering a deduplicated backup at a local computer, such as computer 212 of FIG. 2. At block 602, a digest for the desired data segment may be retrieved from a local database (not depicted).

At block 604, the digest may be sent to a storage database, such as storage database 214. In a process 606 carried out at the storage database, the digest may be used to retrieve the encrypted segment associated with the digest.

At block 608, a message containing the encrypted segment may be received at the local computer and at block 610 the encrypted segment may be recovered from the message.

At block 612, the initialization vector (IV) and encryption key 2 may be retrieved from local storage or from remote storage. The IV may be used at block 614 and encryption key 2 may be used at block 616 to decrypt the encrypted segment of data from block 610 at block 618 using the same symmetric encryption algorithm used to encrypt the encrypted segment, for example, the AES-XTS algorithm.

At block 620, the result of the decryption process is the clear data segment. Other recovered segments of data may be recovered using the same process and then combined to recover the original clear data at block 622.

FIG. 7 illustrates a method 700 of storing deduplicated data in a deduplicated database at a server that may be operated, for example, by a deduplicated data storage service provider, in accordance with the present disclosure. At block 702, user credentials may be received and verified. In one embodiment, the credentials are received at a web server using a secure connection, such as a TLS1 or SSL3 protocol connection. The user credentials may establish that a source of the user credentials has a valid account with the service provider and is entitled to services such as the ability to store and retrieve data with the service provider.

At block 704, a message may be received from the source. The message may contain a digest, or may contain the digest and encrypted data to be stored. The digest may be the result of a one-way cryptographic function, such as a hash, of the encrypted data in the keeping of the source. The assumption is that the chance that a hash of two different data elements will produce the same digest are infinitesimally small. Therefore, each digest uniquely represents a single data element. Optionally, at block 704, the encrypted data associated with the digest may be included in the message.

At block 706, the service provider may check in a database to determine if the digest already exists. The database may contain digests and pointers to associated data or the database may contain both the digests and their associated data. Other data storage and database configurations may also be supported. If the digest exists, an assumption is made that the data represented by the digest already exists at the service provider and does not need to be stored again. This situation may occur in many different circumstances, but one exemplary source of duplicated data is routine backup data of computers, where identical data may persist for long periods of times.

If, at block 706, the digest exists in the database, the 'yes' branch from block 706 may be taken to block 708. A message may be sent to the source that the data exists. The service provider may discard any data received in the message of block 704.

If, at block 706, the digest does not exist, the 'no' branch from block 710 may be taken to block 710, and a message may be sent to the source that the digest does not exist at the service provider.

In response, at block 710, if the encrypted data was not part of the original message at block 704, the source may send a payload message including at least the encrypted data to the service provider. The digest may also be included with the encrypted data for ease of indexing and storage. Alternatively, a message identifier associated with the digest may be included with the encrypted data so that it may be correctly indexed to the previously received digest.

At block 714, the digest and the encrypted data may be stored in the database of the service provider, where the digest is used as an index to the encrypted data. The service provider may send a confirmation message to the source indicating successful storage of the encrypted data (not depicted).

To retrieve information from the service provider, the source, or client, may first be authenticated, if not already in a session. Then, the source or client may provide the digest related to encrypted data of interest. If the digest is present, the encrypted data may be retrieved and sent to the source or client.

If the digest is not present, the service provider may return an error.

The system and method of the current disclosure provide a benefit to data owners by giving them control of the security of their information while achieving the benefit of low cost, deduplicated offsite storage of archival and other data. Because each data item that is stored is encrypted in part with a key based on the data itself (for example, the IV) and in part with a fixed key known only to the data owner, there is an extremely low risk of a successful cryptographic attack on information from the data owner, whether the information is taken separately or grouped with other data.

This deduplication process can be applied across a large business or enterprise, with the benefit of storing like data only one time even though it may be present in many locations.

Use of keys locally generated and controlled provides protection from intrusion by both the service provider, other parties using the service provider, or from unexpected disclosure to the public. Simplicity is maintained as a user of the system need only the second key and a database of IV values to recover information. If a trust relationship exists across business or enterprise domains, the original keys can be used at more than one location. The result is that the service provider need only store one copy of encrypted data, even if more than one facility has identical data.

One technical effect of using this system and method is that network bandwidth between the user and service provider is reduced because local processing of the data allows the data to be kept at the user site while the (normally) much smaller digest is evaluated at the service provider. Only after the service provider confirms a copy is needed is the encrypted data sent to the service provider. Further, because the encryption is performed by the users/data owners, the service provider can provide a higher guaranteed level of service because demands caused by peak loads for encryption are reduced or eliminated.

Because the service provider can eliminate the need for local data encryption, they can significantly reduce the equipment associated with key generation, key storage, and key maintenance. Further, the service provider can reduce or eliminate the significant technology commitment associated with a high data security environment for facilities and procedures to prevent data and key security breaches.

However, because the local user is only responsible for their own data, a commensurate increase in security requirements is not transferred to the original data owners. Because the encrypted data is not stored on site, even access to the keys at the local user facility does not create a security breach of itself. Thus, the local user sees the technical effect of reduced storage space and more secure data storage/archiving with only a minimal technology commitment to key management.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method of encrypting at a local computer and storing on a remote computer deduplicated information, the method comprising:

generating a first key and a second key using a cryptographic function of the local computer;

placing a segment of data into a working memory at the local computer;

performing a keyed hashing function on the segment of data using the first key to generate an initialization vector (IV);

encrypting the segment of data using a two-key encryption routine using the second key and the IV to generate an encrypted segment;

performing a hash of the encrypted segment to create a digest;

sending the digest to the remote computer external to the local computer;

receiving from the remote computer an indication of whether the digest is present at the remote computer;

when the digest is not present at the remote computer, sending the encrypted segment to the remote computer;

storing the IV and the digest at a local memory of the local computer retrieving from the local memory at the local computer i) the digest and ii) the IV corresponding to the segment of data;

receiving the encrypted segment from the remote computer;

decrypting the encrypted segment using the second key and the IV, the decrypting performed using the two-key encryption routine; and saving the segment of data to the local memory to recover the segment of data.

2. The method of claim 1, further comprising:
when the digest is present at the remote computer, discarding the encrypted segment.

3. The method of claim 1, further comprising:
deleting the segment of data and the encrypted segment from the local computer.

4. The method of claim 1, further comprising:
separating an information set into a plurality of segments for encryption at the local computer and storage as a deduplicated set on the remote computer.

5. The method of claim 1, wherein encrypting the segment of data comprises using a modified AES-XTS algorithm using the IV in place of a disk segment identifier in a standard AES-XTS algorithm implementation.

6. The method of claim 1, wherein the remote computer is connected to the local computer via one of the Internet and a local area network (LAN).

7. The method of claim 1, further comprising: assembling an information set from one or more recovered segments of data.

8. A computer for processing data for deduplicated storage comprising:
a processor;
a cryptographic unit coupled to the processor;
a random number generator coupled to the cryptographic unit;
a communication port coupled to the processor and an external network; and
a memory containing computer executable instructions that when executed on the processor cause the computer to perform the following:
generating a first key and a second key at the random number generator;
creating an initialization vector (IV) from the data to be stored in a deduplicated database, the IV created at the cryptographic unit using a keyed hash algorithm and the first key;
encrypting the data at the cryptographic unit to create encrypted data using a two-key encryption algorithm with the IV and the second key used for the two-key encryption algorithm;
hashing the encrypted data using a hash algorithm to create a digest;
sending the digest and the encrypted data to the deduplicated database via the communication port;
storing in the memory at the computer the digest and the IV for the encrypted data
retrieving from the memory at the computer i) the digest and ii) the IV for the encrypted data;
receiving the encrypted segment from the deduplicated database;
decrypting the encrypted data using the second key and the IV, the decrypting performed using the two-key encryption routine; and
saving the data to the memory at the computer.

9. The computer of claim 8, further comprising:
sending a message carrying the digest to the deduplicated database;
receiving a response that the deduplicated database has an entry associated with the digest.

10. The computer of claim 9, further comprising:
discarding the encrypted data responsive to receiving the response that the deduplicated database has the entry associated with the digest.

11. A method performed at a server for processing and storing deduplicated data, the method comprising:
receiving a message over a network from a remote computer;
parsing the message to extract i) a source of the message and ii) a payload including a digest, the digest being a hash of encrypted data;
determining that the source is entitled to services;
when it is determined that the source is entitled to services, comparing the digest to a database coupled to the server and including digests;
receiving encrypted data from the remote computer, the encrypted data the result of a two-key encryption process of original data performed entirely at the remote computer, wherein one of the two keys used in the two-key encryption process is derived from the original data at the remote computer;
storing the encrypted data using the digest as an index for identifying the data
when it is determined that the digest does not exist in the database, sending a first message to the remote computer indicating that the digest does not exist;
subsequent to sending the first message that the digest does not exist, receiving the encrypted data and optionally, another copy of the digest; and
when it is determined that the digest exists in the database, sending a second message to the remote computer indicating that the digest exists.

12. The method of claim 11, wherein sending the second message to the remote computer that the digest exists comprises deleting the digest received in the message from the remote computer.

13. The method of claim 11, wherein determining that the source is entitled to services comprises verifying login credentials presented by the source.

14. The method of claim 11, further comprising:
sending a confirmation message that the encrypted data and the digest were successfully stored at the server.

15. A method performed at a server for processing and storing deduplicated data, the method comprising:
receiving a message over a network from a remote computer;
parsing the message to extract i.) a source of the message and ii.) a payload including an encrypted data and a digest of the encrypted data;
determining that the source is entitled to services;
when it is determined that the source is entitled to services, comparing the digest to a database coupled to the server and including existing digests, wherein only digests from the source are included in the comparison;
when the digest exists in the database, sending a first message to the remote computer that the digest exists and discarding the payload;
when the digest does not exist in the database, sending a second message to the remote computer that the digest does not exist;
storing the encrypted data using the digest as an index to the encrypted data; and
after sending the message that the digest does not exist, receiving a payload message over the network from the remote computer, the payload message including the encrypted data and optionally, the digest;
wherein the encrypted data is generated at the source using a two-key encryption algorithm with at least one key based on an unencrypted version of the encrypted data and the digest is generated at the source by performing a hash of the encrypted data.

16. The method of claim 15, further comprising:

receiving a request to retrieve encrypted data from the source, using the digest to locate the encrypted data;

receiving a digest corresponding to the encrypted data; and sending the encrypted data to the source.

* * * * *